Patented Feb. 13, 1934

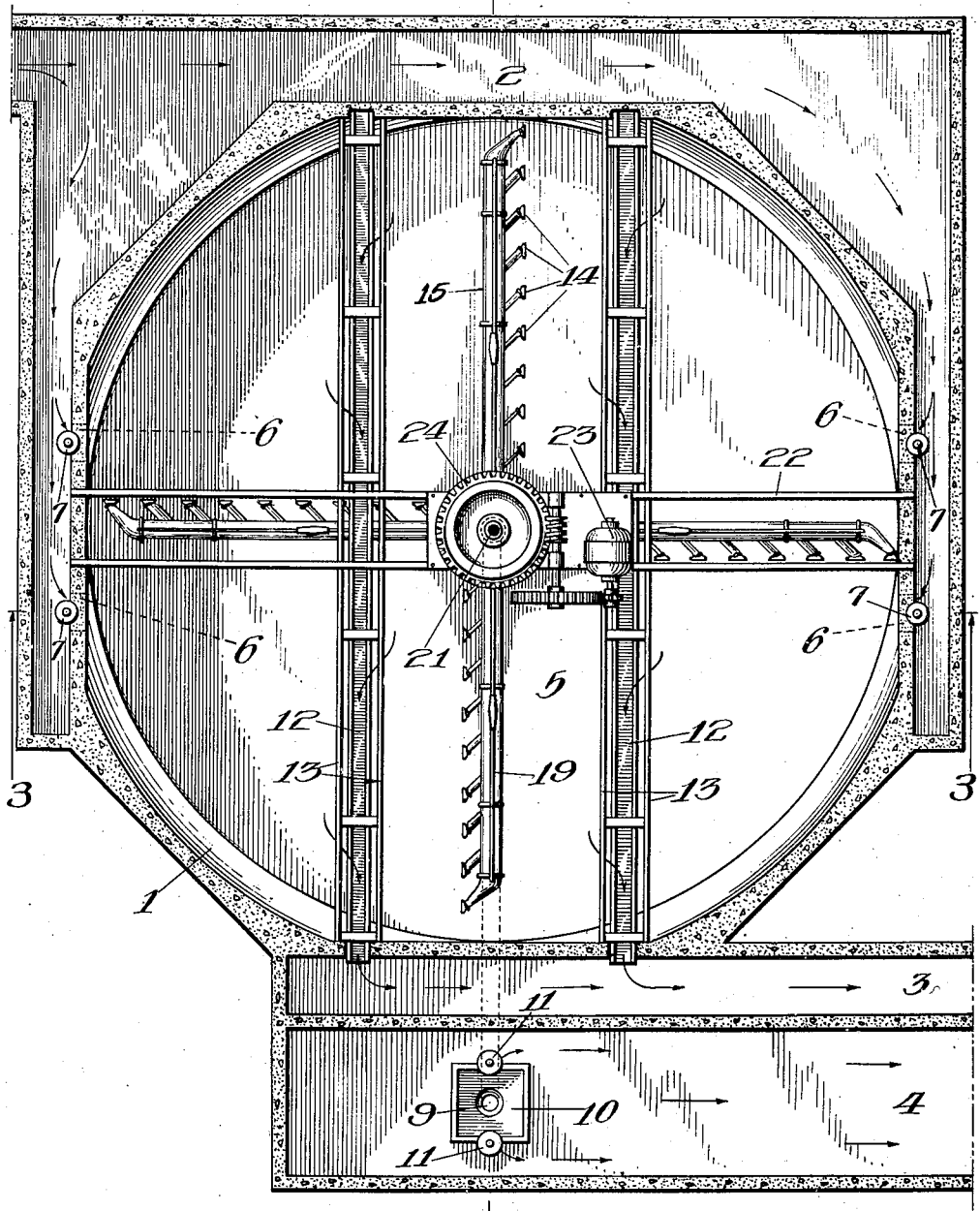

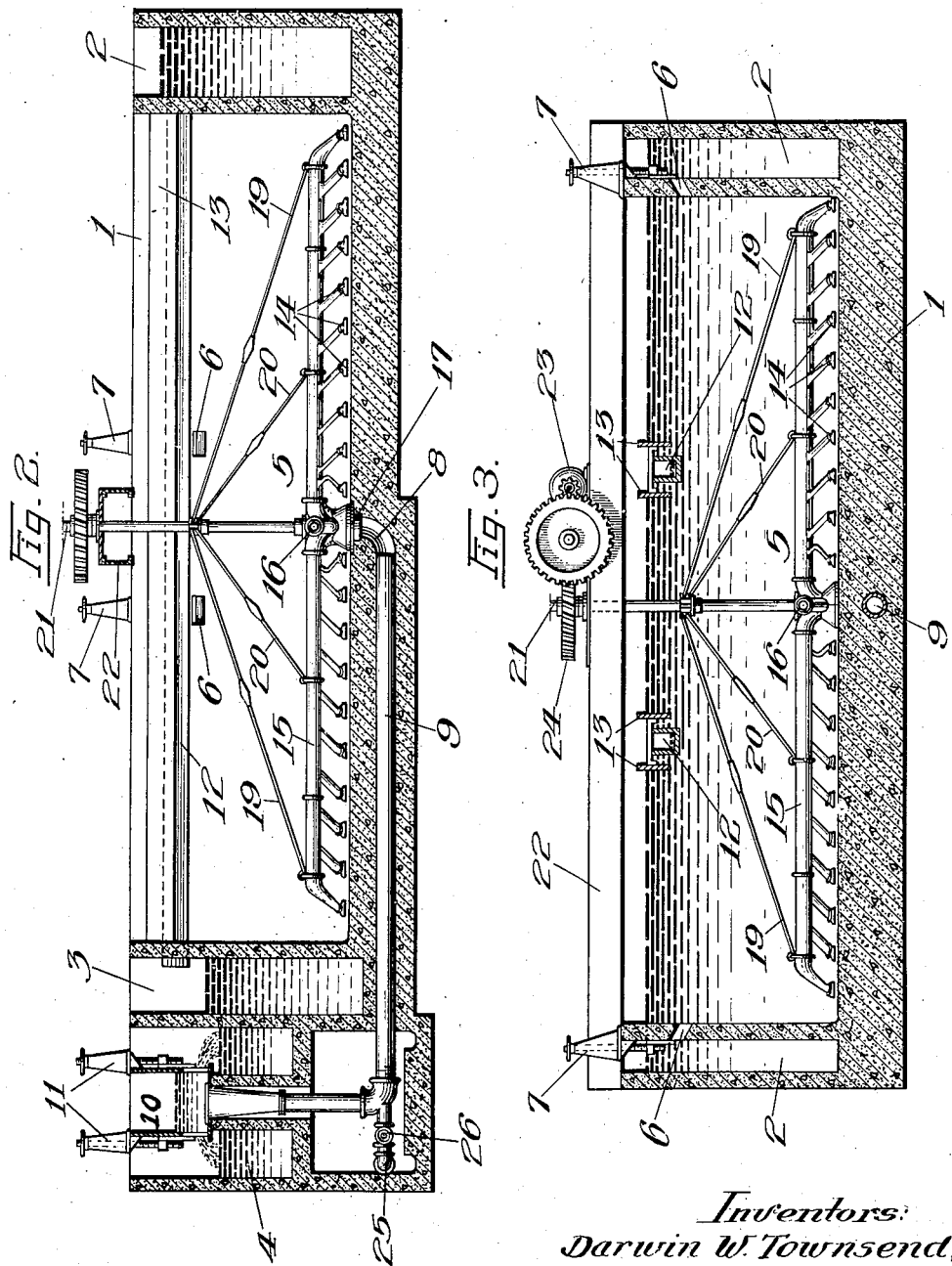

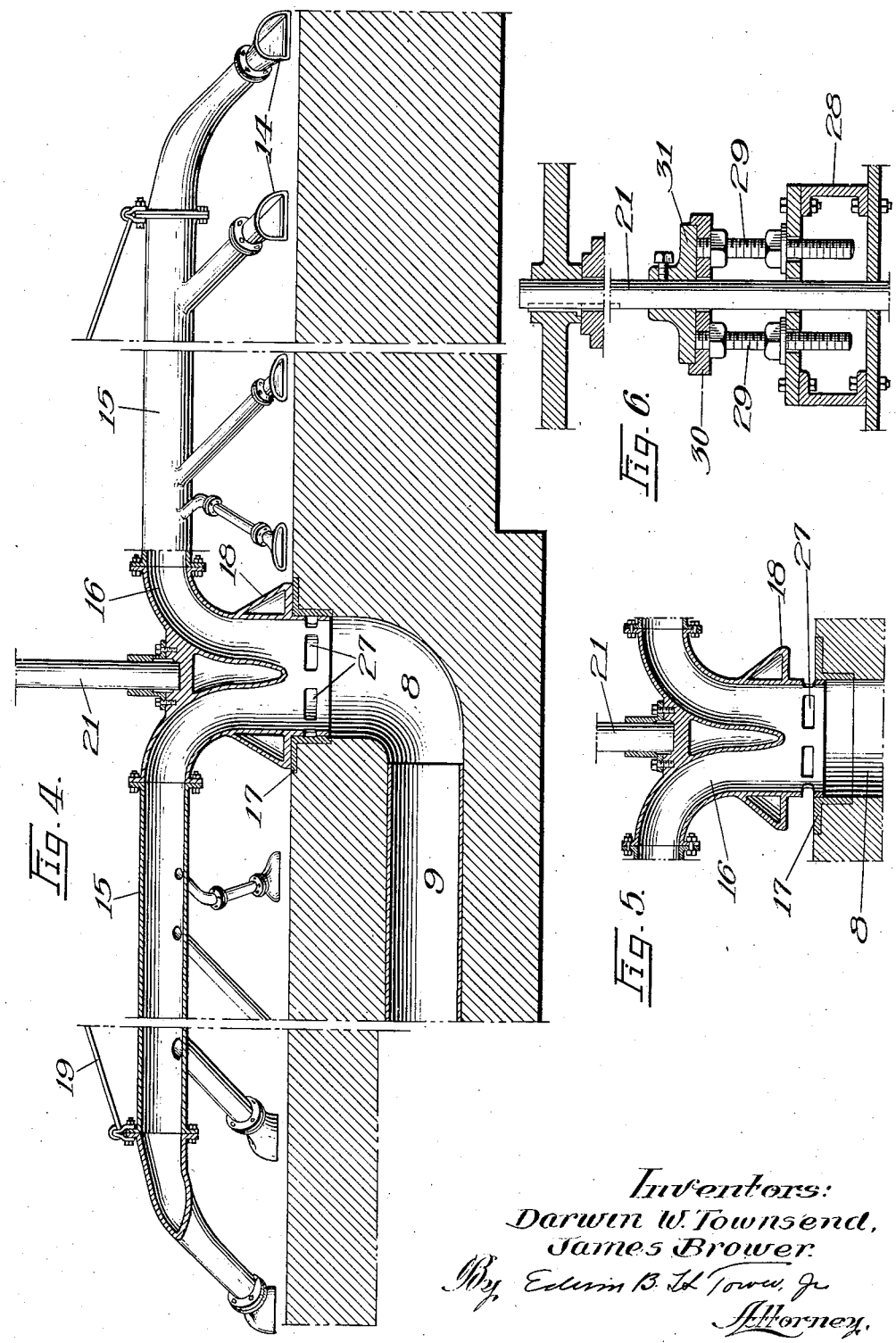

1,947,429

UNITED STATES PATENT OFFICE 1,947,429

SLUDGE REMOVER

Darwin W. Townsend and James Brower, Milwaukee, Wis., assignors to Chain Belt Company, Milwaukee, Wis., a corporation of Wisconsin Application December 4, 1929. Serial No. 411,532

9 Claims. (Cl. 210—55)

The present invention relates to a method of and apparatus for the removal of separable matter which is being carried in suspension by a liquid; and has for its object to improve such method and apparatus in particulars that will be hereinafter particularly set out. The invention has been devised with special reference to the treatment of city and industrial sewage, and this description will, therefore, be addressed to the treatment, with increased efficiency, of city sewage by the now well known activated sludge method for the separation and recovery of the solid materials thereof.

The invention will be the more easily appreciated and its importance understood if certain facts incident to the activated sludge method of sewage treatment be borne in mind. In practicing such method the raw sewage has introduced into it certain quantities of activated sludge obtained from already treated sewage in order to start and hasten the bacterial action upon which the method depends. From this it follows that a certain amount, varying according to circumstances, but always of considerable volume, of the sewage being treated is re-handled, this necessitating increased equipment and expense of operation. One of the objects of the invention is to reduce the relative amount of the returned and re-handled sewage material, thus saving in equipment and operating expense, besides effecting improvements in final results obtained, as will be later pointed out.

Another fact is that activated sludge in flocculent state,—a product of the method being discussed,—will settle quite rapidly if the liquid carrying it be brought to a relatively quiescent state—even though the specific gravity of such flocculent material be but little greater than that of the liquid itself,—and will collect in a mat or bed at the bottom of the liquid where such settling is taking place, leaving the liquid above, which passes off as the non-septic effluent, clear and practically innocuous. But if such settled sludge deposit be stirred up or agitated and again disseminated throughout the body of the liquid, it becomes difficult and costly from a commercial or practical point of view to again cause precipitation thereof, but rather the sludge mixes with the effluent of the system, clouds the same and passes off therewith, and is apt to become septic, defeating the purpose of the sewage treatment and causing the effluent to become a menace and danger to public health.

It is another purpose of this invention to remove the settling sludge from the treated sewage continuously without agitation thereof such as would cause its re-dissemination throughout the body of the liquid, with consequent saving in expense and improvement and increase in the clarified effluent passed; such removal of the sludge from the liquid being accomplished in a more thorough manner, and the removed sludge being of greater density and with less liquid volume than has been attainable by any method or apparatus heretofore known to us.

Other objects and advantages will be set forth hereinafter.

According to the invention as herein disclosed, liquid and the separable matter carried thereby are directed into a tank and separated therein. The separated matter is then removed at a uniform rate from substantially every point on the bottom of the tank or on a plane parallel to the surface of the liquid.

The invention is ordinarily employed to remove sediment from liquids and is herein described as applied to the removal of sludge from sewage, however, the invention is not limited to that particular use.

The sewage is directed into a tank or settling basin in which the sludge is precipitated and from which the sludge is removed by hydrostatic pressure.

The inflow of sewage and the discharge of sludge and clarified liquid may be continuous so that the apparatus requires little attention.

The sludge is removed by a rotary sludge remover having a hollow hub connected to the discharge outlet of the tank, collecting pipes extending radially from the hub and communicating with the interior thereof, and collecting nozzles arranged along the collecting pipes to collect the sludge and deliver the same to the collecting pipes as the sludge remover is rotated.

The collecting nozzles are so arranged that the sludge is collected at a uniform rate from substantially every point on the bottom of the tank during each revolution of the sludge remover.

The sludge is caused to flow into the collecting nozzles by hydrostatic pressure so that the rate of flow and the density of the collected sludge may be varied by varying the rate of flow of the sewage into the tank and the flow of the sludge discharged therefrom.

The flow of sludge into the collecting nozzles causes down-currents in the sewage in the tank which greatly accelerate the precipitation of the sludge and the precipitation is further increased by directing the sewage into the tank in a downward direction.

The down-currents in the sewage cause the sludge to be precipitated at a substantially uniform rate over the entire area of the tank bottom.

Apparatus embodying the invention is shown in the accompanying drawings in which the views are as follows:

Fig. 1 is a top plan view view.

Fig. 2 is a vertical section on the line 2—2 of Fig. 1.

Fig. 3 is a vertical section on the line 3—3 of Fig. 1.

Fig. 4 is a central vertical section through the lower part of the sludge remover with parts thereof broken away.

Fig. 5 is a vertical section through the hub of the sludge remover, showing the same raised to permit the contents of the tank to flow directly into the discharge outlet.

Fig. 6 is a vertical section through mechanism for raising the sludge remover.

The apparatus comprises, in general, a separating tank or settling basin 1 in which the sewage is separated into sludge and clarified liquid, a supply conduit 2 to deliver sewage from its source to the tank 1, discharge conduits 3 and 4 to receive, respectively, clarified liquid and sludge from the tank 1, and a rotary sludge remover 5 arranged in the tank 1 to remove the sludge therefrom and deliver the same to the conduit 4.

The supply conduit 2 delivers sewage to the tank 1 through inlets or ports 6 which are inclined downwardly and provided with inlet valves 7 to control the inflow of sewage.

The tank 1 has a sludge discharge outlet 8 arranged in the center of the bottom thereof and communicating with a discharge pipe 9 which leads to a sludge receptacle 10 arranged in the discharge conduit 4 and provided with outlet valves 11 to control the discharge of sludge therefrom.

The level of the sewage in the tank, the rate of flow through the tank, the degree of separation, and the density of the precipitated sludge are all controlled by the valves 7 and 11.

The sewage in the tank 1 is maintained at a definite level so that the clarified liquid may overflow into open troughs 12 which are carried by opposite side walls of the tank 1 and discharge into the conduit 3.

Scum or other floating matter is prevented from entering the troughs 12 by scum boards 13 arranged at the sides thereof and supported thereby so that, if the valves 7 and 11 are properly adjusted, the liquid delivered to the conduit 3 is clear and free from foreign matter.

The precipitated sludge is collected by the sludge remover 5 through collecting nozzles 14 which are arranged along collecting pipes 15 extending radially from a hollow hub 16 and communicating with the interior thereof.

The hollow hub 16 extends into the outlet 8 and is journaled in an annular bearing 17 which is carried by the bottom of the tank 1 and engages a shoulder 18 on the hub 16 to support the sludge remover.

The collecting pipes 15 may be supported also by braces 19 and 20 having the lower ends thereof secured to the pipes 15 and the upper ends thereof to a vertical shaft 21 which has one end connected to the hub 16 and the other end journaled in a strut 22 arranged across the top of the tank 1.

It will be observed, by reference to the drawings, that the sludge collector and remover which has been described has the collecting pipes 15 arranged some considerable distance above the bottom or floor of the tank 1, while the nozzles 14 carried thereby extend downward, with their mouths or inlet openings located quite close to such floor. In a practical installation of the present invention, which has been in operation since 1929, the tank 1 is about fifteen feet in depth, the pipes 15 are about three feet above the floor and the nozzles come to within about one inch or less of the floor surface. With such an arrangement the pipes 15 are substantially above the denser part of the bed of sludge which collects in the tank so they do not disturb it by their movements or cause the flocculated particles thereof to be disseminated throughout the body of liquid. And the nozzles are so disposed that they do not cause a breaking down of the bed of sludge until they are in position to directly collect and confine it and direct it to the pipes 15.

The sludge remover is rotated by an electric motor 23 which is carried by the strut 22 and operatively connected to a gear or worm-wheel 24 secured to a vertical shaft 21.

The nozzles 14 extend downwardly, outwardly and forwardly in the direction of rotation of the sludge remover and are joined to the pipe 15 at an oblique angle to reduce the resistance to the flow of sludge therethrough.

The openings in the nozzles 14 are large enough to collect the sludge without material agitation thereof before it is fully enclosed within the nozzles and they vary in size in accordance with the distance each nozzle is spaced from the hub 16 as those nearer the outer ends of the collecting pipes 15 traverse a greater area of the tank bottom and collect a greater amount of sludge than those nearer the hub 16.

The paths of the nozzles 14 carried by one pipe 15 do not coincide with the paths of the nozzles carried by the adjacent pipes 15 so that substantially every point on the bottom of the tank 1 is traversed by one or more nozzles during each revolution of the sludge remover.

The sludge remover is rotated at slow speed to pass the nozzles 14 over the tank bottom so that the precipitated sludge is not agitated and, as the sludge is collected in closed nozzles and pipes, the same is not diffused into the clarified liquid.

The precipitated sludge is collected while still in suspension and the pressure of the sewage in the tank causes the same to flow into the nozzles 14, through the collecting pipes 15, the hub 16, the outlet 8, the discharge pipe 9, and the sludge receptacle 10 and past the valves 11 to the discharge conduit 4 which carries the same away and is so arranged that the level of the sludge therein is always below the level of the sewage in the tank.

The flow of sludge into the collecting nozzles 14 causes down-currents in the sewage in the tank which assist in precipitating the sludge and also assist in causing the sludge to be precipitated evenly over the entire area of the tank bottom.

The inlet ports 6 are arranged below the level of the liquid in the tank 1 and inclined downwardly to direct the incoming sewage toward the center of the tank bottom and prevent the same from polluting the clarified liquid at the top of the tank.

The density or concentration of the sludge is susceptible of close control as the same may be varied by adjusting the valves 7 and 11 to vary the rate of flow through the tank or by regulating the speed of the sludge remover 5 to vary the rate of removal of sludge from the tank bottom.

The density of the sludge blanket or bed,—which is largely determined by the depth of the deposit, and this depth, in turn, by the intervals between successive collections through the nozzles and pipes 15,—should be, for reasons of economy and efficiency, as great as possible, bearing in mind the other factors of the process that must be considered. It is recognized by engineers skilled in the practice of the activated process of sewage treatment that a sludge carrying from one and one half (1½) to two (2) per cent solids is, for efficiency and economy, substantially the highest density or concentration obtainable in the settling tank. While sludge of this density is obtainable with the present day settling tank, the resultant sludge draw-off, prior to our invention, from tanks having the aforesaid dense sludge, has been of less density (perhaps as low as one per cent.). This decrease in density of the sludge draw-off, we believe to be caused by the non-uniform sludge withdrawal from the whole area of the tank bottom, a defect which we correct by our invention. With sludge of high density, as first mentioned, a less proportion of the entire amount of the sewage treated is required for "seeding" the raw sewage, that is delivering it into the incoming flow thereof, than is necessary when a less concentrated sludge is employed. And when it is remembered that from twenty to forty per cent. of the entire amount of sludge deposited is so returned, the saving effected by using a dense sludge becomes apparent and indeed is an important factor in operation.

The sludge is ordinarily conducted by the conduit 4 to a treating or conversion plant but it may be diverted to a point of disposal through a drain pipe 25 which is connected to the discharge pipe 9 and controlled by a normally closed drain valve 26.

By closing the inlet valves 7 and opening the drain valve 26, the contents of the tank 1 may be drained to the level of the nozzles 14.

The entire mobile contents of the tank may be drained by providing mechanism to raise the sludge remover 5 sufficiently to uncover drain ports 27 which are formed in the side wall of the hub 16 and normally covered by the bearing 17.

The drain ports 27 are shown uncovered in Fig. 5 and mechanism for raising the sludge remover to uncover the same is shown in Fig. 6.

The lifting mechanism is carried by a support 28 which may be connected to or form a part of the strut 22.

The support 28 has lifting screws 29 journaled therein and supporting a bearing 30 which abuts a collar 31 arranged upon the shaft 21 and fixed thereto.

In the treatment of activated sewage and other solid-bearing liquids in which the solid substances tend to flocculate and settle, for the purpose of removing the sludge that collects during such treatment, it is found that the solid substances settle relatively rapidly immediately after flocculating; but, if after once settling they are agitated and caused to disseminate through the body of the liquid, a second settling thereof is relatively very slow. It is therefore of the utmost importance that any method of treatment to remove the sludge or settled flocculated material, in order to be practically successful, shall be of such character as not to stir up the settled flocculated substances but rather allow them to remain quiescent after first settling and until the moment they are separated from the deposited mass for removal.

Another feature of great importance in the practical treatment of sewage to separate and remove the sludge is that such removal shall be continuous, that is capable of being carried on for long and indefinite periods of time during which precipitation of the sludge takes place; and that it shall be complete, that is to say, the removal of sludge must be from the entire floor surface of the tank or receptacle wherein sedimentation is taking place, else portions of the deposit remaining unremoved, putrefaction therein takes place with resulting foul odors and/or danger to health.

The method herein illustrated and described and the apparatus by which it is carried out are such that the settled and collected sludge is removed with little or no agitation of a nature that tends to cause the material constituting such sludge to be again disseminated through the body of liquid being treated for clarification and sludge removal. The process described is a continuous one, or one susceptible of continuous operation. The arms 15 carrying the series of collecting nozzles 14 are so deposited that the open ends or collecting mouths of the nozzles approach the bank of deposited sludge which is to be removed and take such material directly into the nozzles and the pipes or arms 15 without preliminary agitation of the mass. In this respect the collector differs from prior apparatus of which we have knowledge wherein the movements of the collecting arms or nozzles employed agitated the material by being moved over the top thereof or by being dragged through the same preliminary to taking away the sludge from the mass. By employing a series of hollow arms 15 carrying collecting nozzles 14 arranged as described, and moving these slowly and successively over the floor of the tank in which the sewage or other material is caused to settle, the sludge may be successfully and practically removed from the whole surface of the tank bottom in a uniform manner and without disturbing the quiescence of the settling sludge preliminary to its entrance into the nozzles and ducts constituting the collected and delivery means. By feeding the raw sewage or other liquid into the tank below the surface of the liquid therein and from different sides and at widely separated points as indicated in the drawings, the flow of material from the entrance passages 6 to the discharge openings through the nozzles 14 is very uniform throughout the entire body of liquid within the tank, this being especially true where a plurality of arms such as 15 are employed in the sludge collector. By this arrangement, while there is a downward flow of liquid from the openings 6 to the mouths or openings into the nozzles 14, which flow tends to accelerate the downward movement of the fluocculated material for sedimentation, there are nevertheless no decided currents established which would tend to agitate the settling material and keep it in suspension.

The apparatus disclosed herein may be employed to remove scum or other separable matter from an upper level of the liquid in the tank by simply inverting the sludge remover and discharging the clarified liquid at a lower level.

The invention is also susceptible of other modifications and adaptations within the scope of the appended claims.

The invention is hereby claimed as follows:

1. A separator, comprising a tank wherein separation of sediment-bearing liquid into sludge and clarified liquid takes place, means to insure a relatively dense bed or layer of sludge being deposited uniformly upon the bottom of the tank, and means operating in cycles for withdrawing the accumulated sludge continuously and at a substantially uniform rate from the entire area of the tank bottom, without preliminary disturbance thereof tending to re-disseminate it throughout the body of the liquid in the tank, during each complete cyclic operation thereof, the deposit of the sludge and its removal taking place simultaneously.

2. The combination, with a tank having an inlet for delivering sediment-bearing liquid to said tank to be separated therein into sludge and effluent, a discharge outlet for said effluent and a discharge outlet for said sludge, of a sludge remover rotatable about a vertical axis and comprising a hollow hub communicating with said sludge outlet, a collecting pipe communicating with said hub and extending radially therefrom, collecting nozzles arranged along said pipe and carried thereby, means to rotate said sludge remover and cause said sludge to be collected by said nozzles and delivered to said sludge outlet, and means to drain the contents of said tank through said sludge outlet independently of said rotatable collecting sludge remover.

3. In a system for separating matter carried by liquid and capable of separation by sedimentation to form a sludge deposit; a tank wherein sedimentation takes place, a suction-acting collector for the removal of the deposited sludge, and means whereby the collector may be rendered inoperative and the tank connected with an outlet for draining the tank independently of the said sludge remover.

4. In a system for separating matter carried by liquid and capable of separation therefrom by sedimentation to form a sludge deposit; a tank in which sedimentation takes place, a conduit leading therefrom through which the sludge is carried off, a suction-acting collector for removal of the sludge connected with said conduit; and means for simultaneously cutting off the collector from the conduit and for putting the latter into direct communication with the tank so that the latter may be drained.

5. A sediment separator, comprising a tank to receive a continuous flow of sediment-bearing liquid and to have sediment settled from the liquid therein and having a discharge outlet for said settled sediment, and a sediment remover arranged within said tank and rotatable about a vertical axis and having radial horizontal tubes communicating with said outlet and provided with inlets distributed along the same from the inner to the outer ends thereof to remove said settled sediment progressively from concentric circular paths and deliver it through said tubes to said outlet to be received direct from said tank in a continuous flow, the inlets to the horizontal tubes of the sediment remover being progressively larger in proportion to their distance from the axis about which they rotate.

6. The herein described method of treating sewage and similar solid-carrying liquids, which consists in delivering the liquid into a precipitating enclosure and allowing sludge to collect on the bottom thereof by gravity precipitation, leading off the clear liquid from the upper portion of the body of liquid and removing the sludge from the bottom of the enclosure by suction action carried forward simultaneously along concentric circular paths, the removal being progressive and without substantial preliminary agitation of the sludge and the amount of suction removal along any circular path being proportional to the distance of that path from the axial center of the removal operation.

7. The herein described method of treating sewage and similar solid-carrying liquids, which consists in delivering such liquid into a precipitating enclosure and allowing sludge to collect on the bottom thereof by gravity precipitation, leading off the clear liquid from the upper portion of the body of liquid, and collecting and removing the sludge,—the sludge collecting being by suction action carried on progressively over the entire surface of the enclosure and without preliminary agitation of the sludge, the suction taking the sludge from the side of the deposited mass thereof toward which the suction removal is advancing.

8. The method set forth in claim 7 further characterized by this, that the amount of suction collection and removal along any circular path is proportioned to the distance of that path from the axial center of removal, whereby the amount of removal per lineal unit of advance of the suction along a circle nearer the center is the same as the amount of collection and removal per lineal unit of advance along a circular path farther from that center.

9. A collector for removing sludge which is deposited by gravity on the floor of a circular collecting tank, which consists of a series of hollow arms extending outwardly from and rotatable about a vertical axis, adapted to be moved over the bottom of the tank and toward the mass of material to be removed, the arms being provided respectively with a series of entrance orifices which are open in a direction facing that in which the arms are moved toward the mass of sludge material to be taken away through the orifices and arms the entrance orifices to said arms being located successively along the same and of graduated size, the openings nearest the axis of rotation being smallest and successively gradually increasing in size toward the outer ends of the arms.

DARWIN W. TOWNSEND.
JAMES BROWER.